United States Patent Office 2,753,335
Patented July 3, 1956

2,753,335
COPPER-CONTAINING DISAZO DYESTUFFS

Walter Wehrli, Basel, Switzerland, assignor to Sandoz Limited, Basel, Switzerland No Drawing. Application September 30, 1952,
Serial No. 312,391

1 Claim. (Cl. 260—148)

The present application is a continuation-in-part application of my copending application Ser. No. 206,312, filed on January 16, 1951 (now U. S. Patent No. 2,620,331), which itself is a divisional application of the application Ser. No. 604,727, filed on July 12, 1945, now abandoned.

The present invention relates to new copper complex compounds of disazo dyestuffs.

It is a primary object of the present invention to subject—in preparing the new copper complex compounds according to the present invention—a starting compound which corresponds to the formula

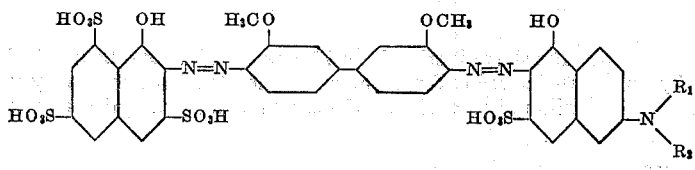

wherein $R_1$ stands for the hydrogen atom or a lower alkyl group, and
$R_2$ stands for a lower alkyl or cycloalkyl group, a mononuclear aryl group with the exception of phenyl, alkylphenyl and alkoxyphenyl, a —CO.alkyl group containing 3 to 12 carbon atoms, a carbalkoxy group, a substituted benzoyl group or a —CO.NH-mononuclear aryl group,
to a treatment with a copper yielding agent, e. g. to a gentle boiling in an aqueous solution in the presence of cuprammonium ions, an alkaline substance such as sodium carbonate or potassium carbonate and, if desired, of an organic base, or to a fusion with an alkali metal salt of a low molecular aliphatic monocarboxylic acid and a copper salt.

The coppering proceeds with splitting off the methoxy groups attached to the diphenyl nucleus of the dyestuffs, and uniform copper complexes which then can be isolated by salting out from the solution, are obtained.

The new copper-containing disazo dyestuffs thus obtained correspond to the formula

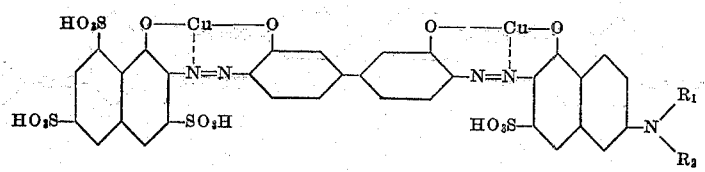

wherein $R_1$ and $R_2$ have the foregoing significancy. They are easily soluble in water, possess excellent affinity for cellulose fibers and dye them in bright blue shades of excellent fastness to light and wet treatments.

The following examples illustrate the present invention without being limitative. The parts are parts by weight and the temperatures are given in centigrades.

Example 1

100 parts of the dyestuff of the formula

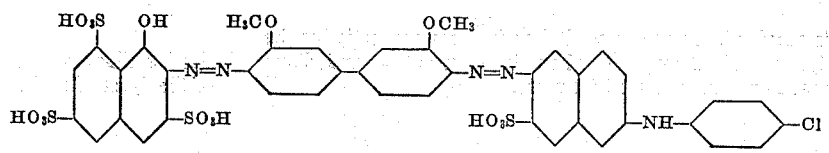

are dissolved in 2000 parts of water with addition of 20 parts of sodium carbonate. To this solution there are added, portionwise and while stirring at 80–90° C., 500 parts of an aqueous solution containing 50 parts of crystallized copper sulfate and 85 parts of a concentrated aqueous ammonia solution. The mixture is stirred for 5 hours at 80–90° C. and heated to boiling within 1 hour.

The solution is then held at the boil under reflux for 15 hours. The copper complex compound thus produced corresponds to the formula

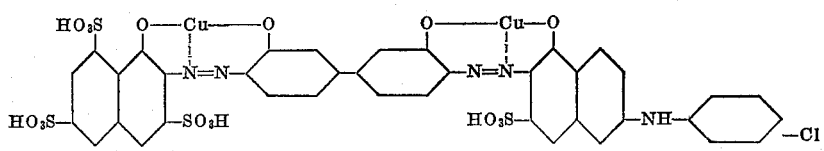

It is salted out, filtered and dried. Soluble in water with a blue coloration and in concentrated sulfuric acid with a greenish-blue coloration, it dyes cotton and fibers made from regenerated cellulose in clear blue shades possessing very good fastness to light, to washing and to water.

*Example 2*

100 parts of the dyestuff of the formula

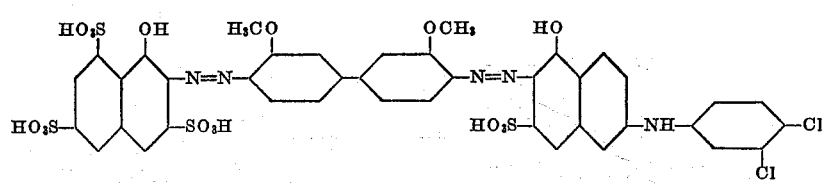

are dissolved in 2000 parts of water and treated as described in Example 1. A dyestuff which corresponds to the formula

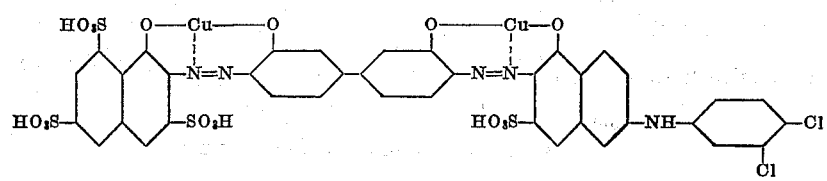

is obtained. It possesses similar fastness properties as the dyestuff of Example 1, when dyed on cotton and fibers made from regenerated cellulose.

*Example 3*

By replacing the starting dyestuff of Example 1 by an equivalent quantity of the dyestuff of the formula

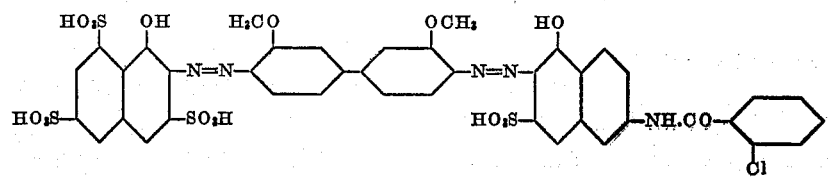

and otherwise proceeding in the same manner as described in such example, a similar dyestuff which corresponds to the formula

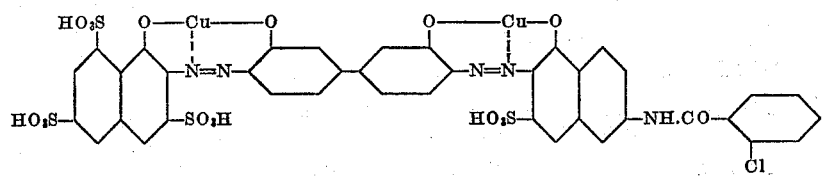

is obtained.

*Example 4*

50 parts of crystallized copper sulfate are dissolved in 200 parts of water of 80° C. Then 350 parts of crystallized sodium acetate are added, followed by 107 parts of the dyestuff of the formula

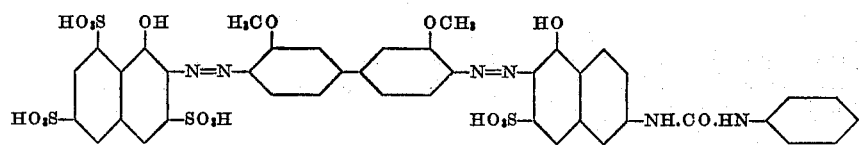

The slurry is stirred for 4 hours at 90° C. and then boiled under reflux for 12 hours. After that time the slurry is allowed to cool to 80° C., and water is added dropwise until all mineral salts are dissolved, the dyestuff not yet being in solution. The copper complex compound thus obtained corresponds to the formula

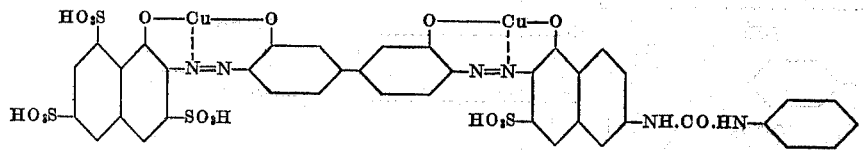

it is filtered, washed and dried. Soluble in water with a blue coloration and in concentrated sulfuric acid with a greenish-blue coloration, it dyes cotton and fibers made from regenerated cellulose in clear blue shades which possess a very good fastness to light, to washing and to water.

*Example 5*

The process according to Example 4 is repeated except that the starting dyestuff is replaced by 113 parts of the dyestuff of the formula

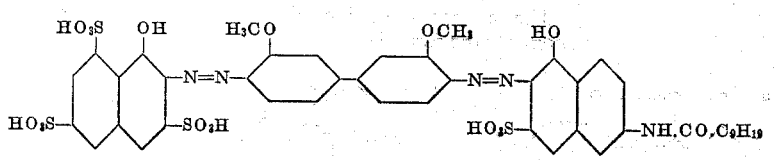

The resultant copper complex compound corresponds to the formula

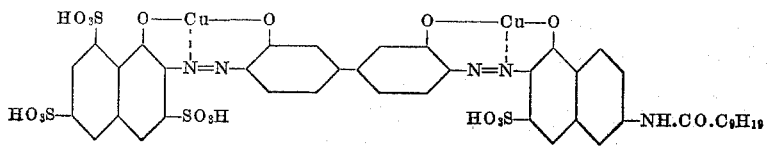

and possesses very good fastness properties when dyed on cotton or fibers made from regenerated cellulose.

*Example 6*

By replacing the starting dyestuff of Example 1 by an equivalent quantity of the dyestuff of the formula

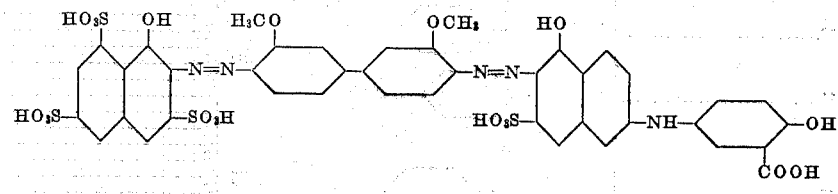

and otherwise proceeding in the same manner as described in such example, a similar dyestuff which corresponds to the formula

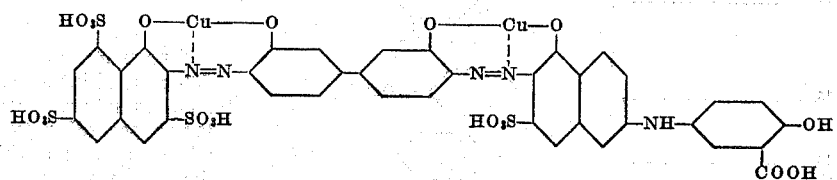

is obtained the dyeings of which on cellulose fibers possess when after-treated with a copper yielding agent, excellent fastness properties.

The dyestuffs which correspond to the formula

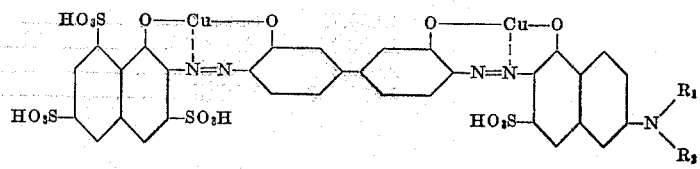

and wherein $R_1$ denotes hydrogen and $R_2$ possesses the significancy given hereinafter, dye shades similar to those of the dyestuffs described in Examples 1 to 6. Their fastness properties are very good.

| Example | $R_2$ |
|---|---|
| 7 | (4-methylphenyl) |
| 8 | (4-methoxyphenyl) |
| 9 | (4-ethoxyphenyl) |
| 10 | (4-propoxyphenyl) |
| 11 | (4-butoxyphenyl) |
| 12 | (4-chlorophenyl) |
| 13 | (4-bromophenyl) |
| 14 | (4-bromophenyl, para position) |
| 15 | (4-carboxyphenyl) |
| 16 | (2-carboxyphenyl) |
| 17 | (4-carboxy-2-hydroxyphenyl) |
| 18 | $-CO-$(4-chlorophenyl) |
| 19 | $-CO-$(4-bromophenyl) |
| 20 | $-CO-$(4-methoxyphenyl) |
| 21 | $-CO-$(4-nitrophenyl) |
| 22 | $-CO-$(2,4-dinitrophenyl) |
| 23 | $-CO-C_2H_5$ |
| 24 | $-CO-C_3H_7$ |
| 25 | $-CO-C_4H_9$ |
| 26 | $-CO-C_5H_{11}$ |
| 27 | $-CO-C_6H_{13}$ |
| 28 | $-CO-C_7H_{15}$ |
| 29 | $-CO-C_8H_{17}$ |
| 30 | $-CO-C_{10}H_{21}$ |
| 31 | $-CO-C_{11}H_{23}$ |
| 32 | $-CH_3$ |
| 33 | $-C_2H_5$ |
| 34 | $-C_3H_7$ |
| 35 | $-CH_2-CH_2-CH_2-CH_2-CH_2-CH_3$ |
| 36 | cyclohexyl-CH |

Example 37

5 parts of cotton are inserted in a dyebath containing 100 parts of lime-free water at 50°. Then a concentrated aqueous solution, containing 0.1 part of a dyestuff obtained according to one of the foregoing examples is added to the bath which is thereupon heated to boiling in the course of a half hour, the boiling temperature being then maintained for a further half hour. In the course of the dyeing process, 0.5 to 2 parts of Glauber salts are added in the form of a concentrated aqueous solution. Upon completion of the dyeing, the material is allowed to remain in the bath until it cools to 50°, whereupon it is rinsed and dried.

Having thus disclosed the invention what is claimed is:

The copper-containing disazo dyestuff which corresponds to the formula

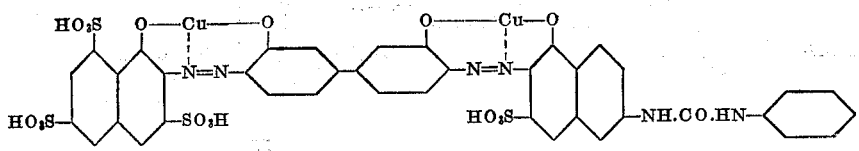

References Cited in the file of this patent

UNITED STATES PATENTS

| | | |
|---|---|---|
| 1,889,732 | Stusser | Nov. 29, 1932 |
| 2,590,346 | Riat et al. | Mar. 25, 1952 |
| 2,620,331 | Wehrli | Dec. 2, 1952 |
| 2,638,468 | Wehrli | May 12, 1953 |